United States Patent [19]

Millett et al.

[11] Patent Number: 5,225,020
[45] Date of Patent: Jul. 6, 1993

[54] PULTRUSION MANDREL WITH INTEGRAL, INTERCOOLED RESIN INJECTOR AND METHOD OF USING THE SAME

[75] Inventors: John R. Millett; Jose A. Munoz, both of Fort Worth, Tex.

[73] Assignee: W. R. Grace & Co.-Conn., New York, N.Y.

[21] Appl. No.: 747,548

[22] Filed: Aug. 20, 1991

[51] Int. Cl.$^5$ .............................................. B65H 81/00
[52] U.S. Cl. .................................... 156/180; 156/166; 156/242; 156/245; 156/311; 156/433; 156/441; 156/578; 264/136; 425/114
[58] Field of Search ............... 156/441, 180, 181, 166, 156/245, 242, 184, 190, 191, 195, 311, 433, 499, 498, 500, 578; 264/136; 425/112, 114

[56] References Cited

U.S. PATENT DOCUMENTS

| | | |
|---|---|---|
| 2,794,481 | 6/1957 | Anderson ..................... 156/194 X |
| 2,871,911 | 2/1959 | Goldsworthy et al. ......... 156/441 X |
| 3,033,729 | 5/1962 | Shobert ......................... 156/149 |
| 3,067,803 | 12/1962 | Fleury ........................... 156/431 |
| 3,277,531 | 10/1966 | Boggs ........................ 156/311 X |
| 3,560,316 | 2/1971 | Gill . |
| 3,674,110 | 7/1972 | Cooke . |
| 3,704,561 | 12/1972 | Meyer . |
| 3,792,141 | 5/1972 | Offutt . |
| 3,853,656 | 12/1974 | McNeely et al. ............. 156/441 X |
| 3,855,031 | 12/1974 | McNeely et al. ................. 156/190 |
| 3,859,409 | 1/1975 | Coonrod . |
| 3,917,774 | 11/1975 | Sagane et al. . |
| 3,983,668 | 10/1976 | Hassman . |
| 4,025,256 | 5/1977 | Heller . |
| 4,053,140 | 10/1977 | Clemens et al. . |
| 4,177,306 | 12/1979 | Schults et al. . |
| 4,244,768 | 1/1981 | Wiechowski et al. . |
| 4,272,704 | 3/1981 | Carlton . |
| 4,276,337 | 1/1981 | Coonrod . |
| 4,289,563 | 9/1981 | Wiechowski et al. . |
| 4,289,563 | 9/1985 | Wiechowski et al. . |
| 4,382,056 | 5/1983 | Coonrod . |
| 4,394,338 | 7/1983 | Fuwa . |
| 4,555,886 | 12/1985 | Wiechowski . |
| 4,760,680 | 8/1988 | Myers . |
| 4,804,425 | 2/1989 | Hoffmann et al. . |
| 4,911,970 | 3/1990 | Rodenbeck et al. . |
| 4,938,823 | 7/1990 | Balazek et al. . |
| 5,071,506 | 12/1991 | Nelson et al. ................. 156/173 |
| 5,092,950 | 3/1992 | Spoo et al. ................. 156/441 X |
| 5,094,798 | 3/1992 | Hewitt . |
| 5,114,633 | 5/1992 | Stewart ..................... 156/180 X |
| 5,174,844 | 12/1992 | Tong ............................. 156/180 |

*Primary Examiner*—Jeff M. Aftergut
*Attorney, Agent, or Firm*—Craig K. Leon; William L. Baker

[57] ABSTRACT

An exemplary pultrusion mandrel of the invention comprises a first portion for arranging a fiber reinforcement substrate thereabout, a second portion having an elongated body and internal heater, and a resin injector system intermediate therebetween and having a plurality of resin injector ports integrally disposed at different angles for wetting inward surfaces of the substrate being formed. The mandrel is preferably used in conjunction with an external die. Also disclosed is an exemplary method for continuous pultrusion.

10 Claims, 8 Drawing Sheets

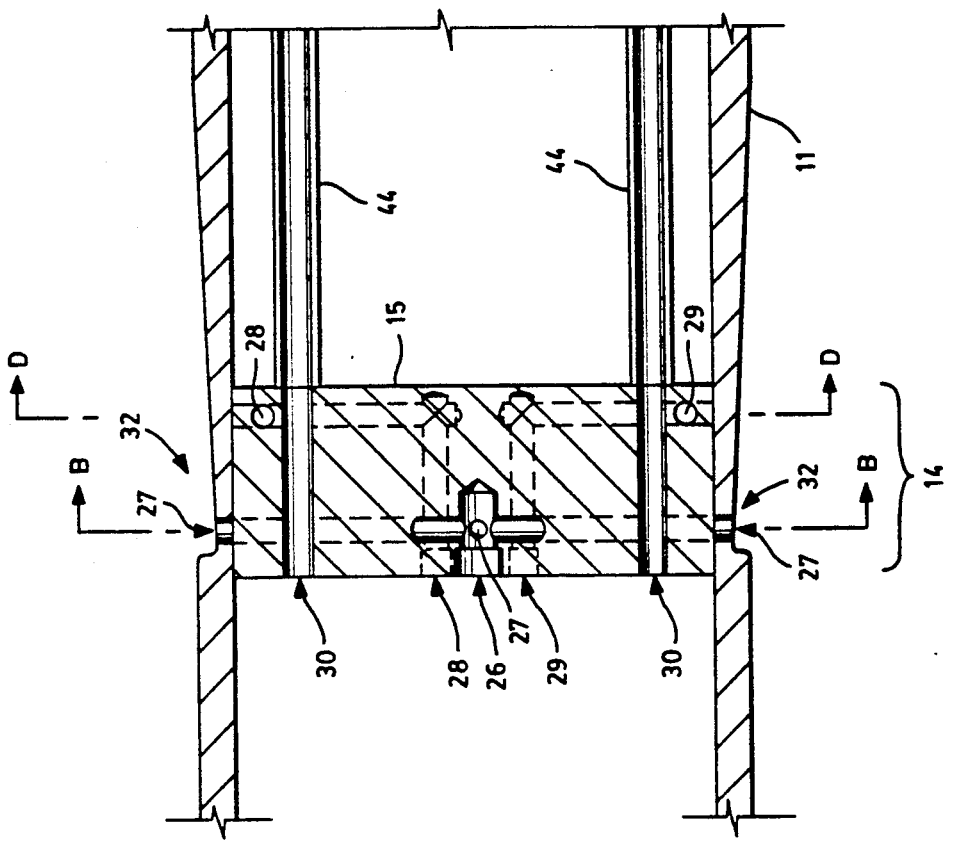
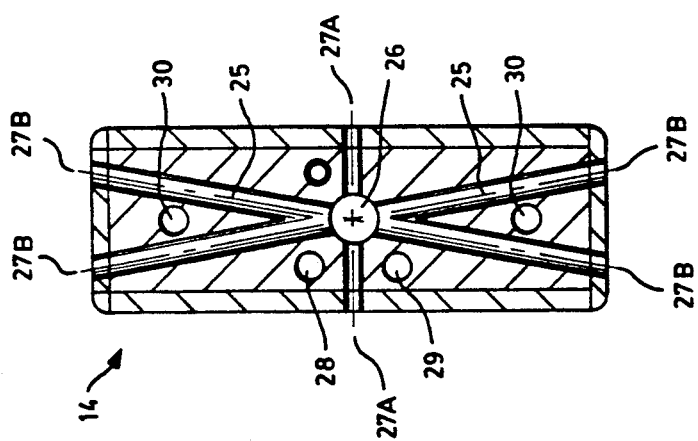

PULTRUSION MANDREL WITH INTEGRAL, INTERCOOLED RESIN INJECTOR AND METHOD OF USING THE SAME

FIELD OF THE INVENTION

The present invention relates to fiber materials, and more particularly to a pultrusion apparatus and method for resin impregnation of fiber substrates.

BACKGROUND OF THE INVENTION

Pultrusion is a process for producing constant profile composites in continuous lengths. Composite articles made by the pultrusion process include I-beams, dowels, floor gratings, and the like. Pultrusion differs fundamentally from extrusion because a combined resin and fiber reinforcement is pulled rather than pushed through a die.

One pultrusion technique requires that a number of strands or rovings of fiber be pulled from continuous rolls through a reservoir of bonding resin to coat the fibers prior to their being shaped and cured. Examples are provided in U.S. Pat. Nos. 3,704,561, 3,983,668, 4,244,768, 4,289,563, and 4555,886. The evaporation of certain solvents from the reservoir, however, poses an environmental problem.

In an alternative technique, a fiber glass reinforcement is coated with resin and shaped around a mandrel in a heated die which cures the injected parts. While a number of articles having a variety of cross-sectional shapes may be fabricated by this method, the walls of these articles tend to be relatively thin and must sometimes be reinforced by lamination or winding with further fiber glass material.

Accordingly, an apparatus and method are needed for producing pultruded articles having substantially thick walls which can be produced in an efficient, convenient, and continuous operation.

SUMMARY OF THE INVENTION

The invention provides a pultrusion mandrel and method capable of injecting thermoset resins into fiber substrates having substantially thick walls and complex cross-sectional structures. In an exemplary method, an exterior die having resin injection ports is preferably used in conjunction with a pultrusion mandrel as will be described more particularly hereinafter. A fiber substrate is assembled generally in the shape of the desired final product and pulled through a resin injection chamber defined between the exterior die and mandrel. Resin is injected on inward substrate surfaces through a plurality of angled integral ports in the mandrel, and then pulled along an elongated portion having an internal heater for accelerating the setting of the resin.

An exemplary mandrel of the invention comprises a first portion which permits the fiber substrate to be assembled or pre-shaped thereabout, an elongated second portion containing an internal heater system, and a resin injection system disposed therebetween. The resin injection system comprises at least two and preferably a plurality of integral resin injection ports disposed at varied angles to wet various substrate inward surfaces. The injection system also includes a cooling system to maintain resin flowability, as well as pass-through channels to permit electrical wires or fuel lines to communicate with internal heating elements.

DESCRIPTION OF THE DRAWINGS

A thorough and complete understanding of the attendant features and advantages of the invention may be more readily obtained when the following detailed description is considered in conjunction with the accompanying drawings, wherein:

FIG. 5 is a view along B of FIGS. 1 and 6;

FIG. 6 is a partial top plan view of an exemplary resin injector system of the invention;

DETAILED DESCRIPTION OF THE INVENTION

Figure 1:
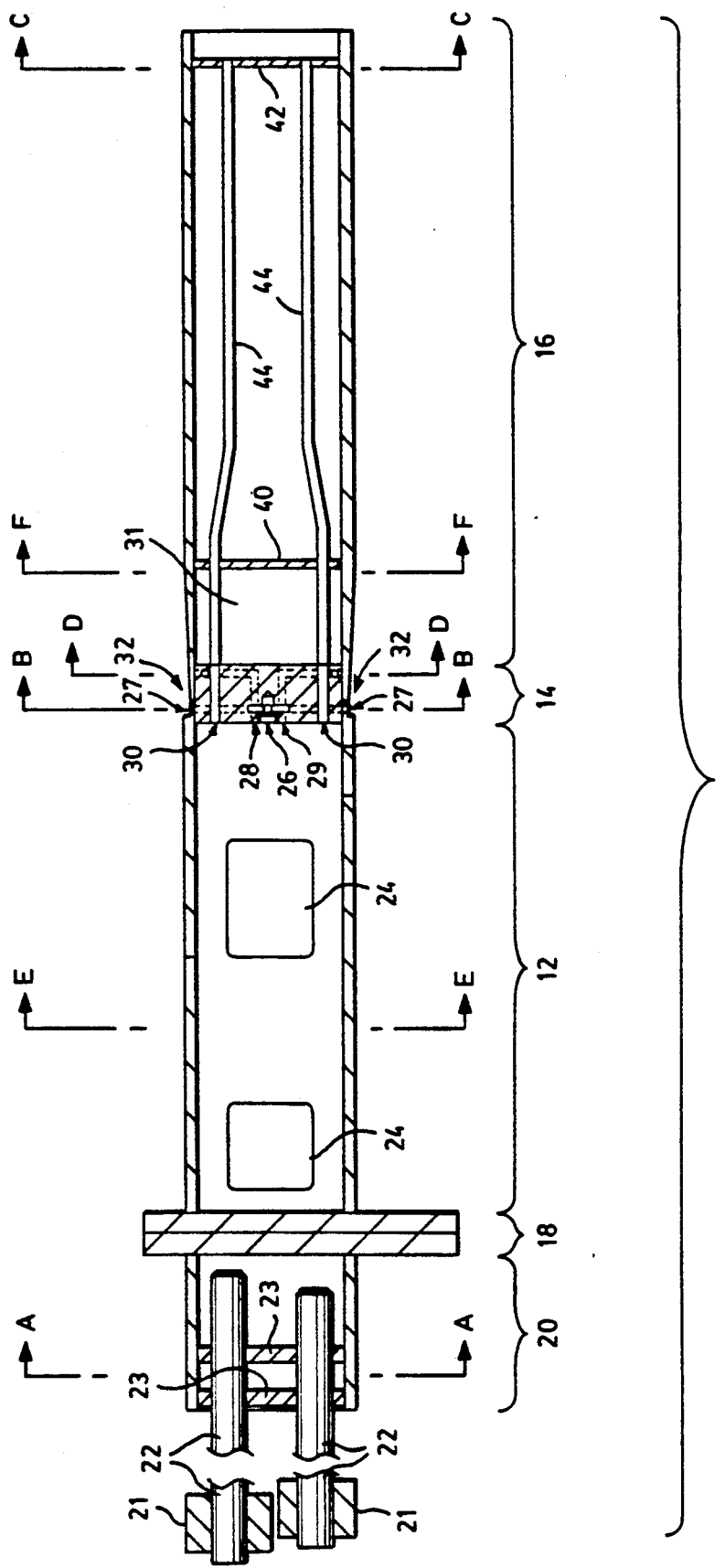
FIG. 1 is a top plan view of an exemplary mandrel of the invention.

FIG. 1 shows an exemplary mandrel 10 of the invention. Briefly, the mandrel comprises a first portion 12 or member about which a fiber reinforcement substrate and/or components thereof can be arranged or assembled prior to being injected with resin, a resin injector zone or system 14 disposed integrally in the mandrel, and a second portion 16 or member which contains a heater (shown as a coil 48 in FIG. 9) for curing the resin injected into the substrate. The continuous length can then be pulled off of the mandrel and sectioned by any known means.

The present invention may be used with any known fibers and thermoset resins. For example, the fiber substrate or reinforcement may be in the form of sheets, roving, cable, ropes, or separate strands, or some combination thereof, and preferably in continuous form. The substrate may comprise glass fibers, natural fibers such as cotton, jute, and paper; and even exotic filaments such as boron, graphite, ceramic, and sapphire. Any thermoset resin can be used, such as a mixture of polyester resin and styrene monomer.

Figure 8:
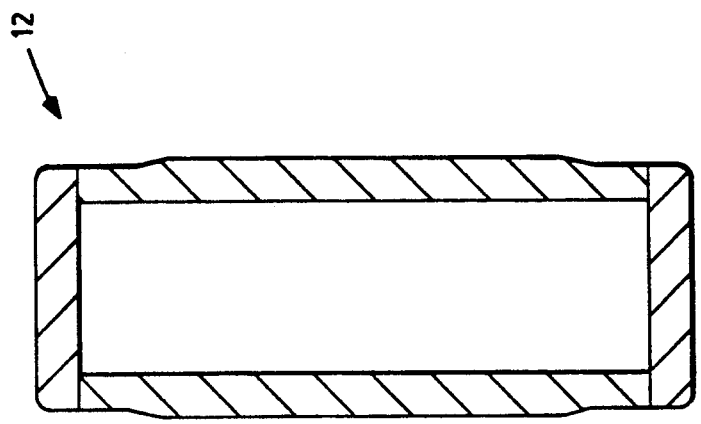
FIG. 8 is a view along E of FIG. 1.
Figure 9:
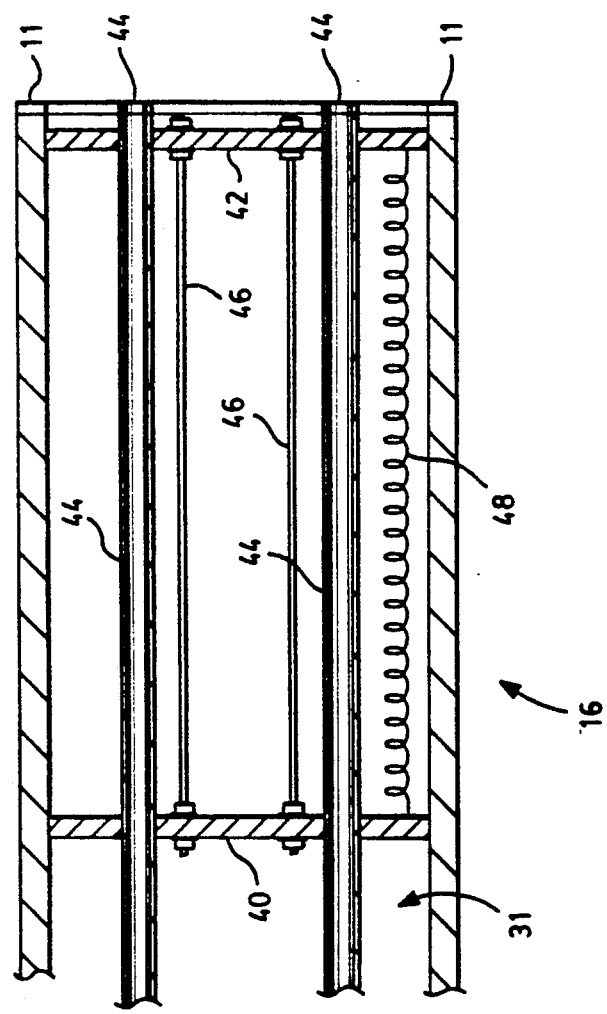
FIG. 9 is a partial top plan view of an exemplary mandrel of the invention.

The first portion 12 or member of an exemplary mandrel 10 comprises essentially a hollow elongated body as shown in FIG. 1 and in the cross-sectional view of FIG. 8. Substrate components such as sheets or ropes are laid over and/or around the first portion 12, which can assume a variety of shapes and is preferably in the general shape of the desired final product. Openings 24 in the bottom of the first portion permit access to the resin injector system 14; in particular, they permit the system to be supplied with resin and coolant. The openings 24 also permit electrical wires or fuel pipes to be fed through to channels 30 and conduits 44 or pipes within the resin injector system 14 and consequently to the second mandrel portion 16 which contains an internal heater 48 (FIG. 9). The openings 24 may be located in a variety of locations on the mandrel, but their location on the first portion 12 is preferable.

Figure 2:
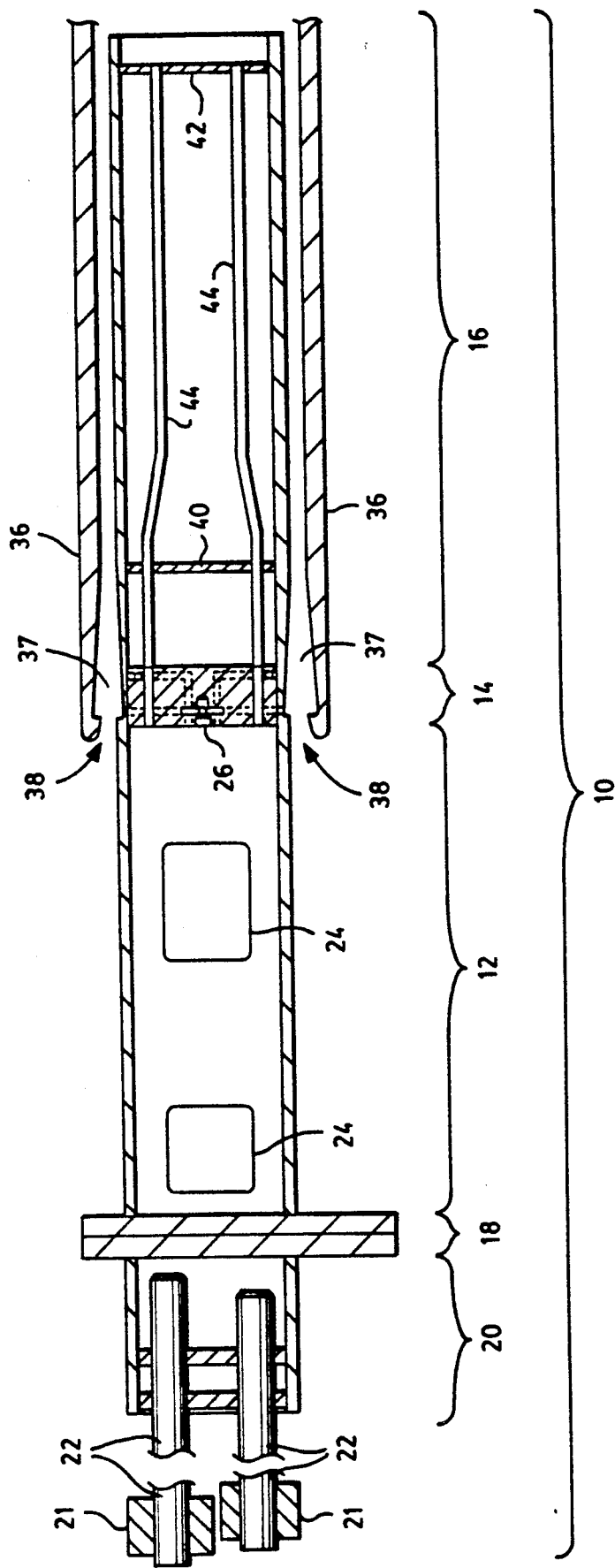
FIG. 2 is a top plan view of the mandrel of FIG. 1 in combination with an exterior die.

In a further exemplary embodiment, the mandrel comprises a steel plate 18 suitable for mounting the mandrel 10 to a floor, ceiling, table, or other supporting structure. A counterbalance holder 20 on the other side of the plate 18 permits attachment thereto of adjustable counterweights 21 and rods 22. The counterweight system 20-22 allows controlled angular disposition of the mandrel 10 within an exterior die, as shown in FIG. 2. The angular disposition of the mandrel 10 may be altered, for example, to change the relative thicknesses of substrate walls being injected with resin at 14 and heated at 16.

Figure 3:
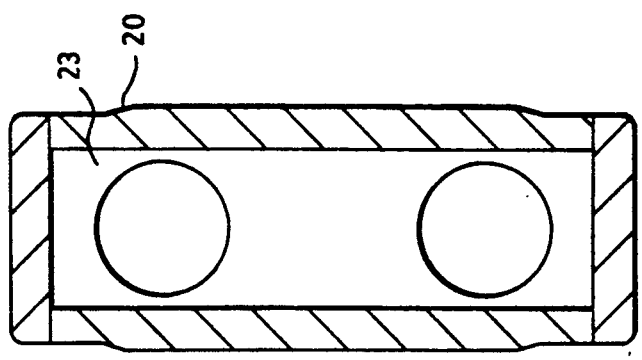
FIG. 3 is a view along A of FIG. 1.

FIG. 3 provides a cross-sectional view taken along A of FIG. 1 of a brace or plate 23 within the counterweight system for holding counterbalance rods 22.

FIG. 5 is a cross-sectional view, taken along B of FIG. 1 of an exemplary resin injector system 14 wherein at least two, and preferably a plurality, of resin injectors 27 are disposed integrally in the mandrel and disposed in at least two different directions outwards to permit various inward surfaces of a fiber substrate to be wetted with resin. An exemplary resin injector system also comprises an internal cooling system in which a coolant, such as water, is circulated within the mandrel structure 14 to maintain the flowability of the injected thermoset resin and to prevent it from prematurely setting. An inlet port 28 and outlet port 29 permit the coolant to be introduced into and removed from the vicinity of resin injector passageways 25. The resin injector system 14 may also comprise, in an exemplary embodiment, pass-through channels 30 or openings to permit electrical or fuel lines to reach the conduits 44 and internal heater 48 (one heating element is generally shown in FIG. 8) contained within the second portion 16 of the mandrel.

Figure 4:
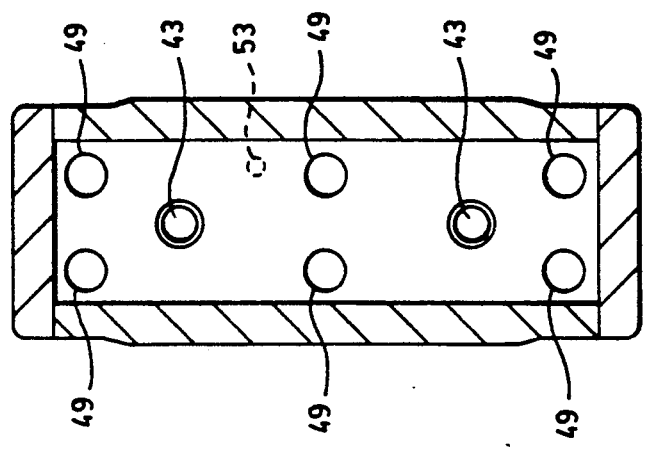
FIG. 4 is a view along C of FIG. 1.

FIG. 4 is a cross-sectional view of exemplary plates 40/42 mountable within the mandrel elongated portion 16. The plate comprises openings 43 for the conduits 44, and openings 49 for holding a number of heating elements 48 (FIG. 9 shows an example of one element). An opening 53 for a thermocouple is also shown.

FIG. 6 is an enlarged view of the resin injector system/zone 14 shown in FIG. 1. In an exemplary embodiment, the resin injector system 14 comprises a block 15 of metal or other suitable material in which channels and ports have been formed or drilled for resin (26/27), coolant (28/29), and various pass-through ports (30). The various channels 26, 27, 28, 29, and 30 may be drilled as at 33 into the block 15 which is then placed into the outer shell 11 of the mandrel. It may be welded, screwed, or otherwise locked into place.

A further resin injection system 14 or zone may include an outer body having indentations 32 disposed upon or around the mandrel body, and conformed to define a resin injection chamber 37 when used in conjunction with an exterior die 36 as shown in FIG. 2. In a further exemplary integral resin injection system 14, the injection ports 27 may be variously sized, spaced from each other, and/or distributed in accordance with the thickness of the substrate that is being pultruded across the resin injection zone 14. One or more resin intake ports 26 may be used. FIG. 5, for example, shows variously sized ports 27a and 27b arranged in a radially outward disposition from the resin intake 26. The use of the block 15 may allow for ready removal and/or interchangeability where it is desired to alter the size of resin injector ports 27 within a given mandrel body.

Figure 7:
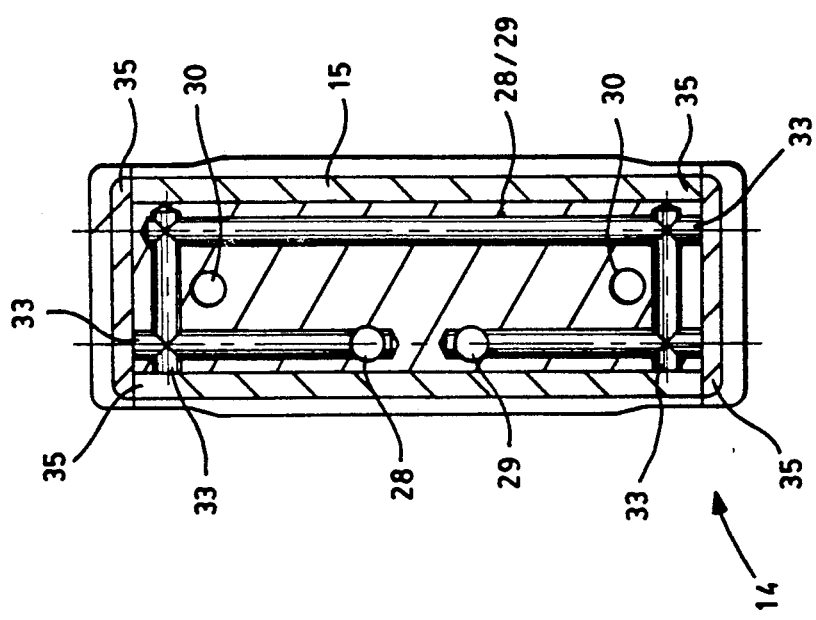
FIG. 7 is a view along D of FIGS. 1 and 6.

FIG. 7. is a cross-sectional view of an exemplary cooling system within the resin injector system/zone 14. A block 15 construction permits drilling of interconnecting channels 33 or passageways that may be capped by end plates 35.

Figure 10:
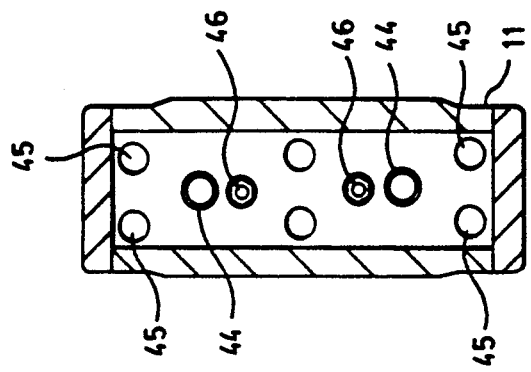
FIG. 10 is a view along F of FIG. 1.

FIGS. 9 and 10 illustrate an exemplary heater system disposed within the elongated curing portion 16 of the mandrel. Pass-through conduits 44 convey electrical wiring (not shown) through and from the pass-through openings 30 within the resin injector system 14. The conduits 44 may comprise ⅛" standard tubing. The conduits 44 and heater elements (one is shown in 48 in FIG. 9) are supported by and between first 40 and second 42 brace plates within the mandrel body 11. Preferably, the first plate 40 is loosely fitted, while the second 42 is snugly fitted, to facilitate permit entire removal or replacement of the heater coils, filaments, or elements. Standard ⅜" threaded rods 46 connect the braces 40/42. Alternatively, electrical wires or fuel line can be run through the conduits 44 and back through openings 45 in the outer plate 42. The heating elements are easily accessible for removal and/or replacement.

Preferably, insulation 31 should be placed in the cavity between the inter-cooled resin injector system 14 and the inner plate 40 so as to further maintain the flowability of the resin being injected (FIGS. 1 and 9).

Figure 11:
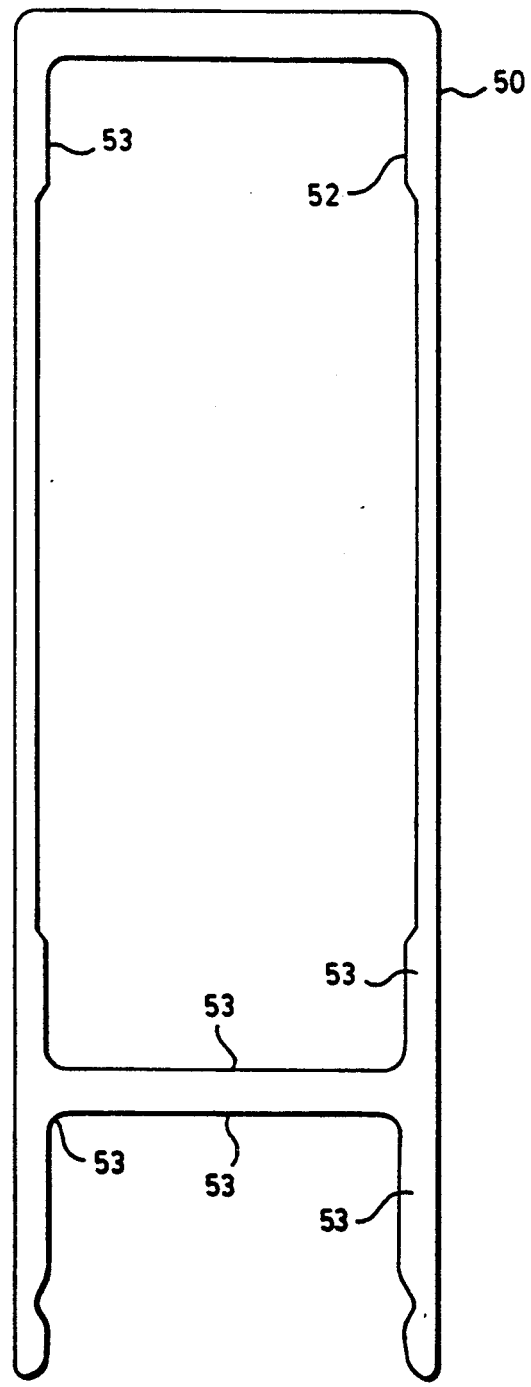
FIG. 11 is a cross-sectional view of a beam produced by an exemplary mandrel of the invention.
Figure 12:
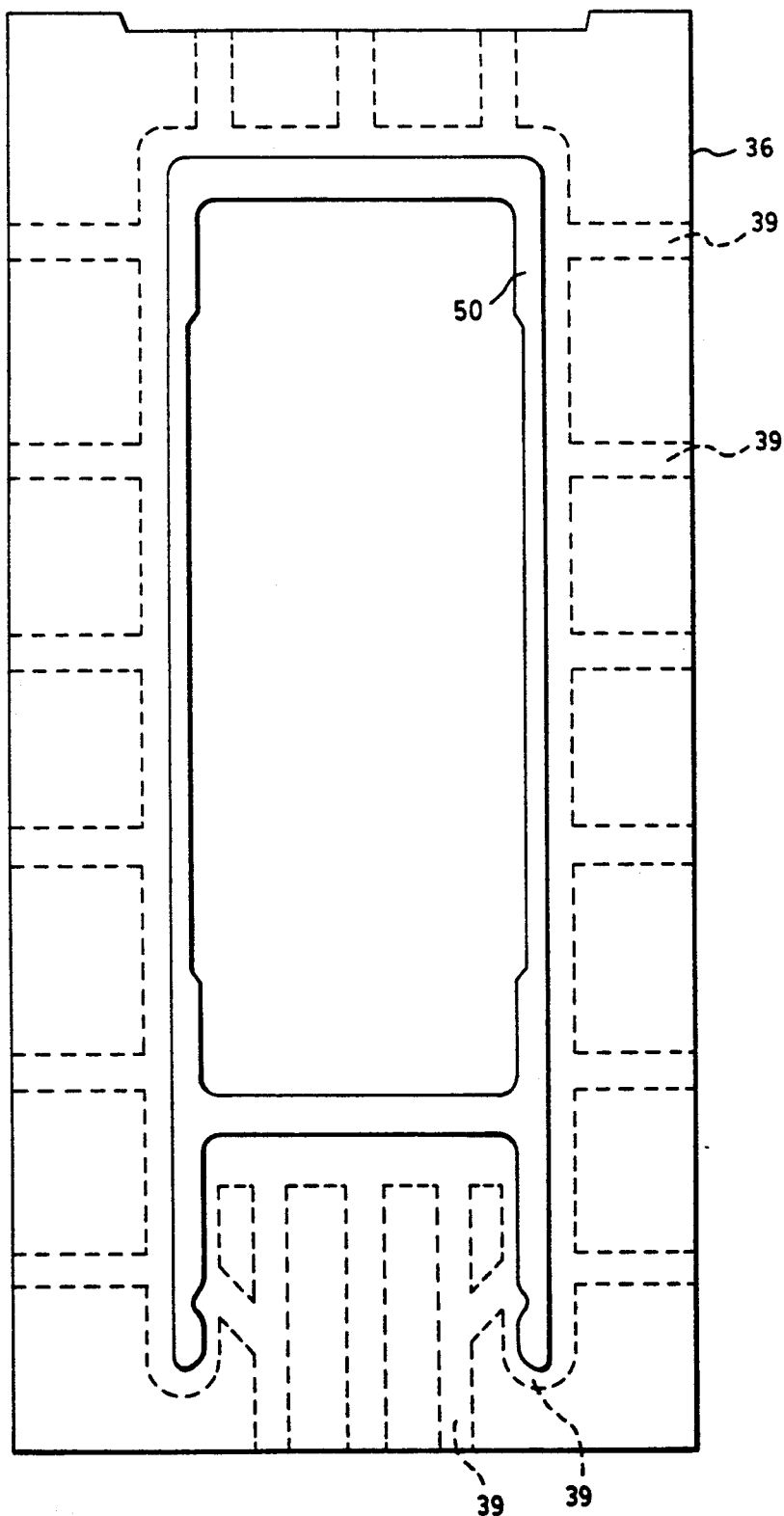
FIG. 12 is a cross-sectional plan view of an exterior die which may be used in conjunction with an exemplary mandrel of the invention.

FIG. 11 is a cross-sectional view of a beam 50 that can be fabricated by the invention. FIG. 12 is a cross-sectional view of an exterior die 36 having resin ports 39 used in conjunction with the mandrel 10 to form the outer surface of the beam 50. As shown in FIG. 11, the inward surface 52 of the beam may be variously contoured in shape and thickness. This may be achieved by varying the location, number, and/or diameter of the integral resin injectors 27 on the mandrel 10. In particular, the size and/or placement of the ports 27 can be adjusted to permit the fabrication of substantially thick walls or joints at certain points of the inward surface 52, as indicated at 53.

The cross-section of the fiber reinforcement substrate can be shaped into an article which encloses a hollow space, as shown in FIG. 11. Alternatively, an unenclosed article may also be produced having merely an inward curve, angle, groove, channel, indentation, or concavity.

The exemplary method of the invention therefore comprises the steps of pre-arranging or assembling the fiber reinforcement substrate or components thereof around the mandrel first portion 12, resin-wetting an inward surface of the assembled substrate by pulling it across a plurality of integral, outwardly disposed resin injection ports 14/27 at least two of which are variously angled, and pulling the substrate along an elongated mandrel portion or sleeve 16 containing a heater for facilitating the curing of the resin.

As modifications and variations of the foregoing exemplary embodiments may be contemplated by those skilled in the art, the scope of the invention is limited only by the following claims.

We claim:

1. A pultrusion method comprising the steps of:
   arranging a fiber substrate about a first mandrel portion;
   wetting an inward surface of the fiber substrate by pulling said substrate over an intercooled resin injector system comprising a block of metal in which a plurality of channels are integrally formed, said block having one resin intake and a plurality of resin injection ports connected to said intake by some of said channels, said block further comprising an integral cooling system defined by an inlet and an outlet for flowthrough of a coolant through other of said channels, and said block having a pass-through channel for electrical wiring; and pulling the resin-wetted substrate along a second mandrel portion, said portion comprising an elongated body and plates being spaced apart from each other along a longitudinal direction within said elongated body and removable from said elongated body as a unit, and electrical heating filaments attached to said plates and disposed along the length of said elongated body, said filaments being electrically communicable with electrical wiring being passed through said intercooled resin injector system.

2. A method of claim 1 wherein in said step of pulling the resin-wetted substrate along a second mandrel portion, said second mandrel portion further comprises spaced distance between said electrical heating filaments and said block of metal of said intercooled resin injector system.

3. The method of claim 2 wherein in said step of pulling the resin-wetted substrate along a second mandrel portion, said second mandrel portion further comprises insulation between said electrical heating filaments and said block of metal of said intercooled resin injector system.

4. The method of claim 1 wherein in said step of pulling the resin-wetted substrate along a second mandrel portion, said second mandrel portion further comprises a thermocouple.

5. A pultrusion mandrel comprising:

a first mandrel portion having a body operative to permit arrangement thereon of a fiber substrate;

an intercooled resin injector system for wetting various inward surfaces of the fiber substrate, said injector system comprising a block of metal in which a plurality of channels are integrally formed, said block having one resin intake and a plurality of resin injection ports connected to said intake by some of said channels, said block of metal further comprising an integral cooling system defined by an inlet and an outlet for flowthrough of a coolant through other of said channels, and said block having a pass-through channel for electrical wiring; and a second mandrel portion for curing the resin-wetted fiber substrate, said portion comprising an elongated body, plates spaced apart from each other along a longitudinal direction within said elongated body and removable from said elongated body as a unit, and electrical heating filaments attached to said plates and disposed within and along a length of said elongated body, said filaments being electrically communicable with electrical wiring being passed through said intercooled resin injector system.

6. The mandrel of claim 5 wherein said intercooled resin injector system further comprises variously sized injector ports in said block of metal.

7. The mandrel of claim 5 wherein said intercooled resin injector system further comprises resin injectors variously spaced from each other in said block of metal.

8. The mandrel of claim 5 further comprising a counterbalance system for controlling the angular disposition of the mandrel.

9. The mandrel of claim 5 further comprising insulation disposed between said intercooled resin injector system and said electrical filaments.

10. The mandrel of claim 5 further comprising a thermocouple disposed within said second mandrel portion.

* * * * *